United States Patent [19]

Weichel

[11] Patent Number: 4,568,030

[45] Date of Patent: Feb. 4, 1986

[54] COMBINATION MEAT SAW AND GRINDER

[76] Inventor: Stan Weichel, P.O. Box 51, Odessa, Saskatchewan, Canada, S0G 3S0

[21] Appl. No.: 551,471

[22] Filed: Nov. 14, 1983

[30] Foreign Application Priority Data

Nov. 18, 1982 [CA] Canada .................................. 415869

[51] Int. Cl.$^4$ ................................................ B02C 1/10
[52] U.S. Cl. .................... 241/101.2; 241/101.4
[58] Field of Search ............... 241/101.2, 101.4, 101.5, 241/101 B, 82.1–82.7; 83/707, 814–817; 29/560

[56]  References Cited

U.S. PATENT DOCUMENTS

| | | | |
|---|---|---|---|
| 889,481 | 6/1908 | Murphy | 51/166 FB |
| 1,465,505 | 8/1923 | Zoergiebel | 241/101.2 X |
| 2,081,033 | 5/1937 | Biro | 83/817 |
| 2,827,085 | 3/1958 | Ocenasek | 83/814 |

Primary Examiner—Mark Rosenbaum
Assistant Examiner—Timothy V. Eley
Attorney, Agent, or Firm—Stanley G. Ade

[57]  ABSTRACT

A band type meat saw includes supporting structure and a table with a meat grinder mounted upon the table in one side of the meat saw. An electric motor is mounted under the framework upon a hinged platform so that the weight of the motor tensions the drive belt which can either be connected to the saw or to the grinder. The drive pulleys for the saw and grinder lie on substantially the same plane as the drive pulley of the motor. An adjustable meat guide slides along the bar on one side edge of the table to control the width of the meat being cut so that it will engage within the grinder bowl.

12 Claims, 8 Drawing Figures

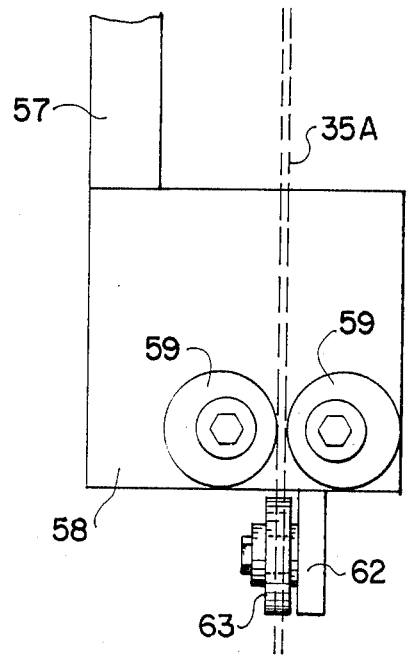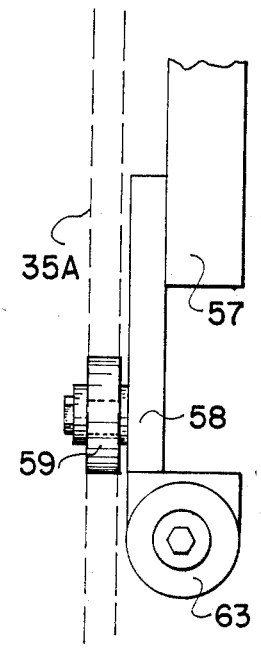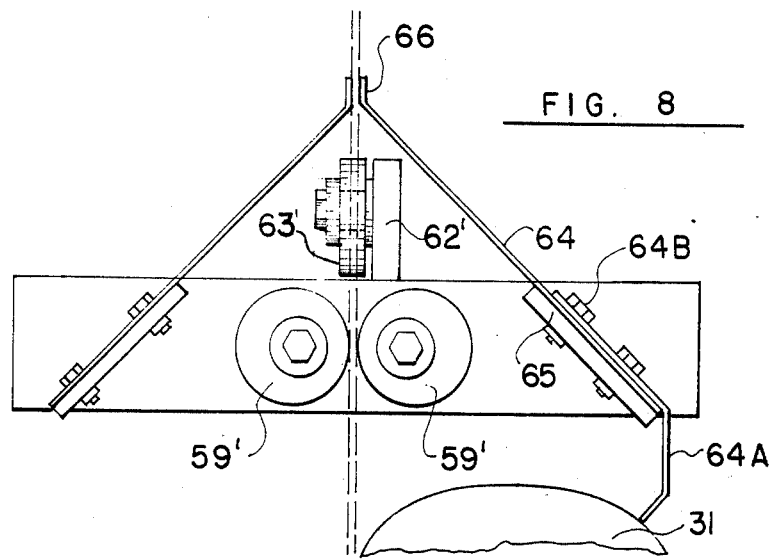

COMBINATION MEAT SAW AND GRINDER

BACKGROUND OF THE INVENTION

This invention relates to new and useful improvements in meat processing apparatus and in particular meat grinders and meat cutting saws.

Conventionally, a band saw is used to cut meat, the pieces of which are then placed in the bowl of a grinder situated at a different location and thence ground to form ground meat.

This only not necessitates two separate pieces of equipment with individual drives therefor but also takes up considerable room.

In many small establishments, it is desirable that space and money be saved particularly in equipment which may not be used continuously.

SUMMARY OF THE INVENTION

The present invention overcomes these disadvantages inherent with conventional equipment by providing a combination meat saw and grinder mounted in a common framework and being driven from a common source of power which is readily connected and disconnected either to one or the other unit.

The device may, if desired, be portable so that it can be stored in any desired location when not in use and can readily be moved into position when required.

In accordance with the invention there is provided a meat saw and meat grinder assembly comprising in combination a supporting framework, a substantially horizontal, planar, meat table mounted upon said framework, a substantially vertically situated, flexible, endless blade type meat saw component mounted upon said framework and extending above and below said table adjacent the rear side thereof, a meat grinder component mounted upon said supporting framework and above the upper surface of said table, a common source of power for said meat saw component and said meat grinder component, and drive means extending from said source of power and being selectively and operatively connectable to said meat saw component or said meat grinder component.

In accordance with a further aspect of the invention there is provided a meat saw and grinder combination in which the meat saw includes novel guiding and blade and pulley cleaning means.

A further advantage of the invention is to provide a device which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 6 is a front elevation of one of the blade guides.
FIG. 7 is a side view thereof.
FIG. 8 is a front elevation of the blade guide and cleaning devices.

In the drawings like characters of reference indicate corresponding parts in the different figures.

DETAILED DESCRIPTION

Figure 1:
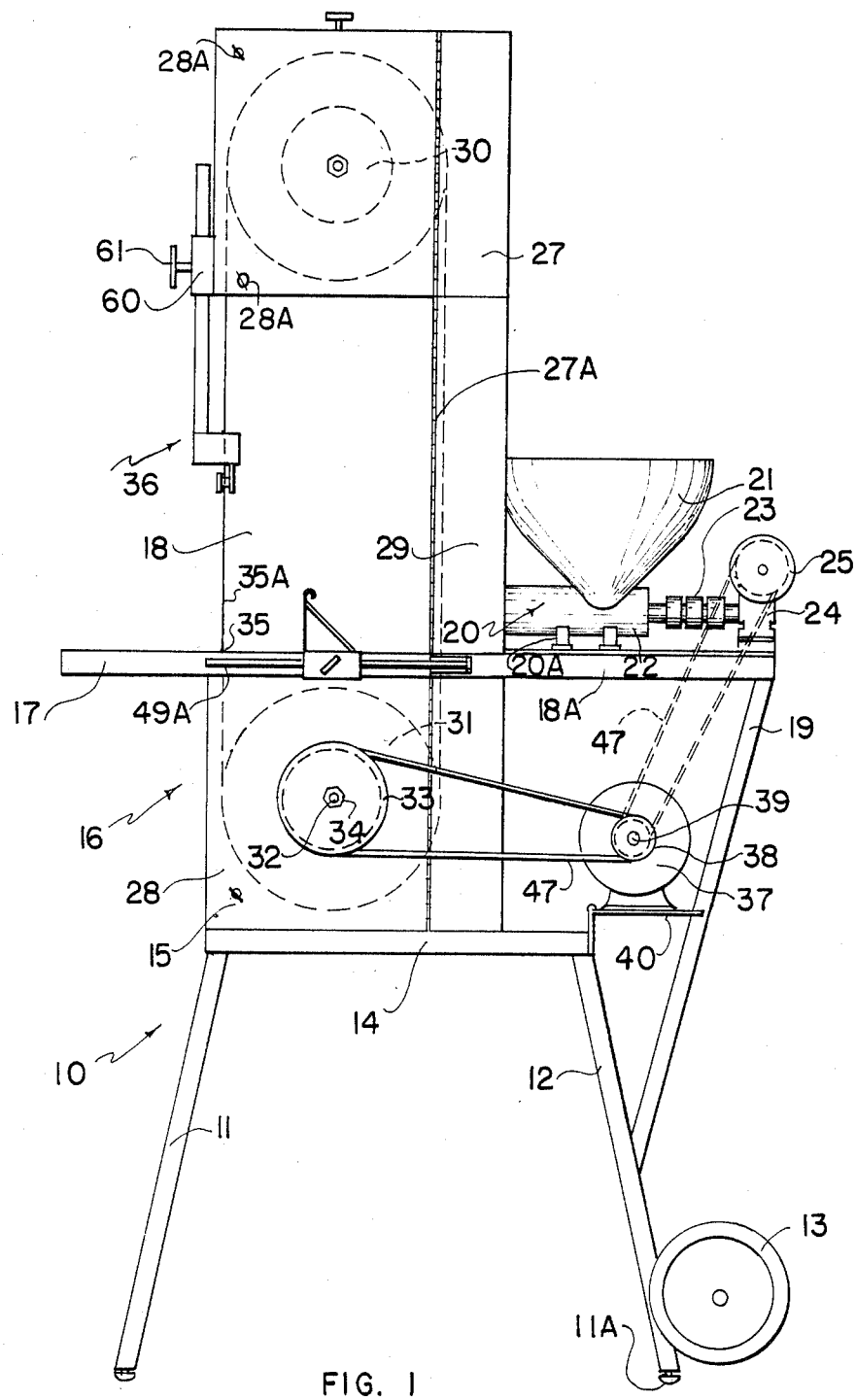
FIG. 1 is a side elevation of the assembly.
Figure 2:
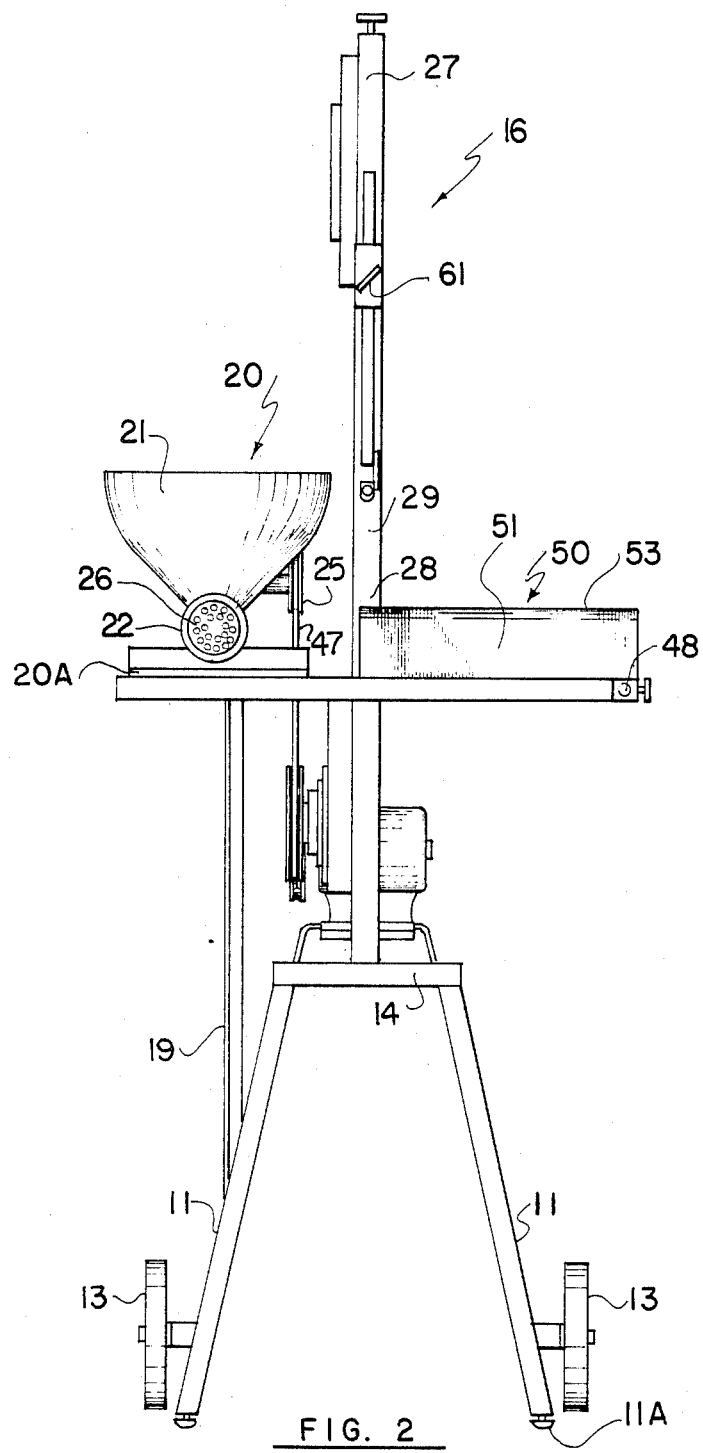
FIG. 2 is a front elevation thereof.

Proceeding therefore to describe the invention in detail, reference should first be made to FIGS. 1 and 2 in which reference character 10 illustrates generally a supporting framework. This framework consists of a pair of front legs 11 with leveling bolts 11A, a pair of rear legs 12, the latter being provided with ground engaging wheels 13 adjacent the lower ends thereof which are positioned so that when in the position shown in FIG. 1, the wheels are clear of the ground but if the front is tilted slightly, the wheels engage the ground enabling the assembly to be moved readily and easily from one location to the other.

A substantially horizontal meat cutting table 17 is mounted at the lower side of the throat 18 of the frame 16 and horizontal frame members 18A extend rearwardly therefrom and are supported at the rear thereof by diagonal frame members 19 extending upwardly from the rear legs 12.

Upon the horizontal frame members 18A, there is bolted, or otherwise secured, a meat grinder component collectively designated 20 which is conventional in construction and includes a feed bowl 21, a grinding member 22, a drive connection 23 and a right angled speed reducer 24 upon which is mounted a drive or grinder pulley 25. A frame or meat grinder plate 20A is situated between the meat grinder 20 and the table 17.

The front end 26 of the grinding chamber 22 is spaced above and substantially flush with the rear edge of the meat table so that meat ground thereby is deposited upon the upper surface thereof.

The meat saw component 16 includes the vertical frame 15 having an upper enclosure 27 and a lower enclosure 28 with the rear connecting portion 29 extending therebetween. A vertical hinge 27A extends between the enclosures 27 and 28 and along this connecting portion 29 so that one side may open for access. The hinged portion encloses the rear run of blade 35 and fasteners 28A hold the hinged portion closed. An upper pulley 30 is journalled for rotation in the upper enclosure 27 with a corresponding pulley 31 being journalled for rotation within the lower enclosure 28. Snaft 32 journals the lower pulley 31 and extends through the enclosure and a drive pulley 33 is secured to the end of this shaft 32 by means of nut 34.

An endless flexible saw blade 35 extends around the pulleys 30 and 31 with the front run specifically designated 35A, passing through the upper saw guide component collectively designated 36 which will hereinafter be described.

A source of power taking the form of an electric motor 37 is mounted within the framework and includes a drive pulley 38 mounted upon the drive shaft 39 of the motor which of course is connected to a source of electrical energy in a conventional manner.

The electric motor 37 is mounted upon a substantially rectangular mounting plate 40 which in turn is supported by a bearing tube 41 secured to the rear edge 42 thereof. This bearing tube bearingly engages around a U-shaped support collectively designated 43 including an elongaged substantially horizontal cylindrical bar 44 and end pieces 45 extending therefrom to be secured as by welding to a horizontal frame member 46 forming part of the horizontal frame 14 of the supporting structure.

The motor is secured as by bolts (not illustrated) and when in the position shown in FIG. 1, the mounting plate 40 is substantially horizontal and pivots in a vertical frame with the weight of the motor supplying the required tension to a drive belt 47. This drive belt extends around pulley 38 and around either pulley 33 of the meat saw component or pulley 25 of the grinder component. The belt 47 is shown in solid line in FIG. 1 connected to the meat saw component and in phantom connected to the meat grinder component.

It will be appreciated that the three pulleys 39, 33 and 25 are substantially in the same plane but it should also be appreciated that the mounting plate 40, via the bearing tube 41 can move endwise within limits, along the cylindrical bar 44 of the U-shaped support thus providing the necessary alignment between the motor pulley 38 and the drive pulley 25 or 33. In both cases the weight of the motor supplies the tension to the belt 47.

Figure 5:
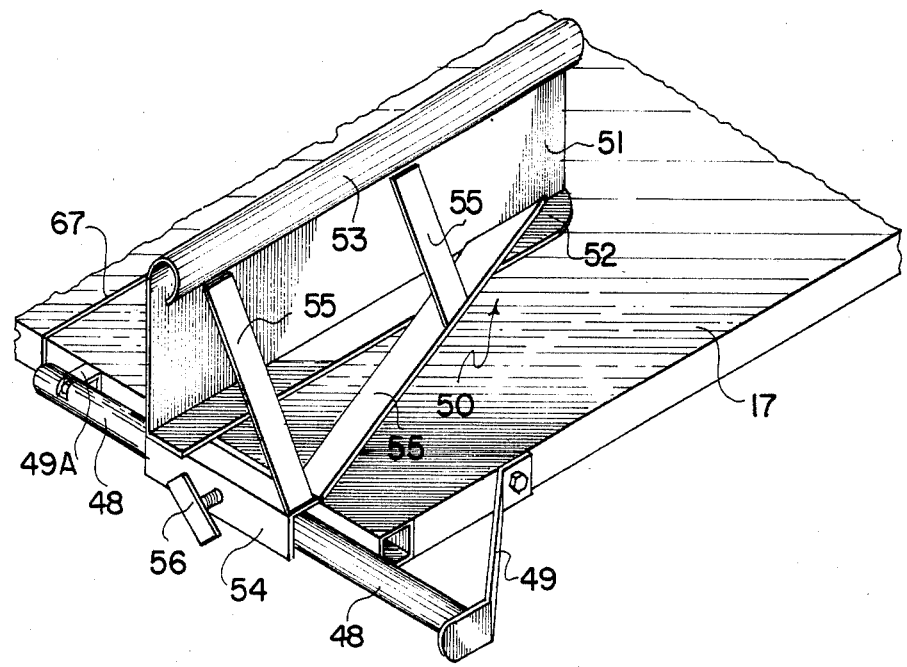
FIG. 5 is a isometric view of the meat guide component.
Figure 3:
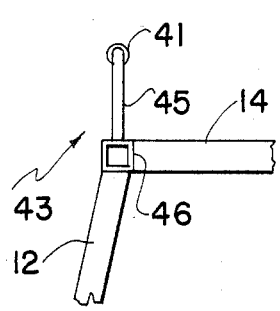
FIG. 3 is a fragmentary end view of the motor mount detail.
Figure 4:
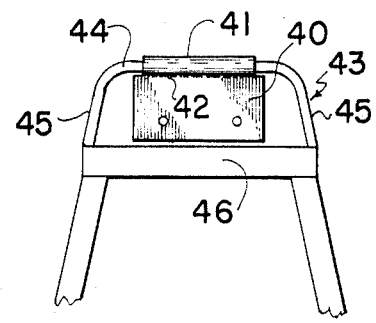
FIG. 4 is a front view of FIG. 3.

Reference to FIG. 5 will show a meat guide assembly secured to the table 17. A rod 48 is mounted between a bracket 49 extending from the rear of the table and an offstanding member 49A secured to one side edge of the table thus spacing the rod therefrom in parallel relationship. The rod 48 is bolted to 49A so that the guide assembly is detachably connected to the table.

The meat guide collectively designated 50 includes a vertical plate 51 with a lower flange 52 and a crimped top edge 53. It is secured to a sliding channel 54 by means of braces 55 with the channel member engaging over the rod 48. Clamp screw 56 maintains the position of the guide on the rod 48, it being understood that the guide can slide along the rod towards or away from the front run 35A of the saw blade.

FIGS. 6, 7 and 8 show the blade alignment guides. The upper guide takes the form of a vertical bar 57 having a bracket plate 58 on the lower end thereof upon which are mounted two vertically situated wheels 59 in close relationship, one upon each side of the front run 35A of the saw blade. This component slidably engages a clamp sleeve 60 extending from the upper enclosure 27 and can be adjusted upwardly or downwardly and detachably secured by means of clamp screw 61. The wheels 59 are eccentrically mounted for adjustment purposes.

FIG. 8 shows the lower blade alignment guide which is similar in construction so that similar reference characters have been used with a prime.

However in addition, cleaning blades are provided taking the form of plates 64 adjustably secured to brackets 65 by means of nut and bolt assemblies 64B and extending inwardly and upwardly therefrom one upon each side of the wheels 59' and 63' and terminating in angulated ends 66 which engage one upon each side of the blade in leading relationship and extend substantially the full width thereof and are resiliently tensioned against the blade so that the blade is cleaned as it passes thereby. These are situated just below the table surface and within a slot 67 formed therein (see FIG. 5).

A lower pulley cleaning plate 64A is also adjustably mounted on one side of the blade cleaning assembly also by nut and bolt assemblies 64B and extending downwardly so that the angulated distal end engages the surface of the pulley 31 and maintains same free of fat and the like.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A meat saw and meat grinder assembly comprising in combination a supporting framework including a rear side, a substantially horizontal, planar, meat table mounted upon said framework, a substantially vertically situated flexible-endless-blade type meat saw component mounted upon said framework, extending above and below said table adjacent the rear side thereof and including upper and lower spaced apart blade pulleys journalled for rotation within said component, and an endless flexible saw blade extending around said blade pulleys, a meat grinder component mounted upon said supporting framework and above the upper surface of said table, a common source of power for said meat saw component and said meat grinder component, and drive means extending from said source of power and being operatively connectable to one of the blade pulleys of said meat saw component and meat grinder components, individually and electively, and means to support said source of power within said framework, said means including a mounting plate, pivotally secured by one side thereof to said framework along a substantially horizontal direction whereby said mounting plate pivots in a substantially vertical plane, said source of power being secured upon said plate, the weight of said source of power tensioning said drive means, said means to support said source of power within said framework including a U-shaped support bar secured thereto, said support bar including an elongated substantially horizontal cylindrical rod and end pieces extending from each end of said rod in spaced and parallel relationship to one another, said U-shaped support bar being secured to said supporting framework by the distal ends of said end pieces and bearing means on said one side of said mounting plate engaging around said elongated cylindrical rod for pivotal movement of said mounting plate therearound and for limited endwise movement therealong for drive means alignment with said meat grinder component or said meat saw component.

2. The assembly according to claim 1 in which said source of power is an electric motor, a drive pulley on the shaft thereof, a drive pulley operatively mounted upon said saw component, a further drive pulley operatively mounted upon said meat grinder component and an endless belt engaging around said drive pulley on the shaft of said electric motor and extending selectively and individually around the drive pulley on said saw component and the drive pulley on said meat grinder.

3. The assembly according to claim 2 which includes an adjustable meat guide plate mounted upon said table for movement towards and away from the endless blade of said meat saw.

4. The assembly according to claim 3 in which said meat saw component includes a frame, said upper and lower drive pulleys being supported for rotation in said frame vertically above one another, and at least one blade alignment and cleaning means mounted on said frame, said blade alignment and cleaning means including a pair of wheels journalled for rotation in a vertical plane, in said frame, and one upon each side of said blade and a pair of plates adjustably extending inwardly and upwardly from said frame to engage one upon each side of said blade substantially the full width thereof and in leading relationship thereto.

5. The assembly according to claim 3 in which said meat saw component includes a lower pulley cleaning plate adjustably extending downwardly from one of said pair of plates; the distal end of said pulley cleaning plate engaging the blade engaging surface of said lower pulley.

6. The assembly according to claim 1 which includes an adjustable meat guide plate mounted upon said table for movement towards and away from the endless blade of said meat saw.

7. The assembly according to claim 6 in which said meat saw component includes a frame, said upper and lower drive pulleys being supported for rotation in said frame vertically above one another, and at least one blade alignment and cleaning means mounted on said frame, said blade alignment and cleaning means including a pair of wheels journalled for rotation in a vertical plane, in said frame, and one upon each side of said blade and a pair of plates adjustably extending inwardly and upwardly from said frame to engage one upon each side of said blade substantially the full width thereof and in leading relationship thereto.

8. The assembly according to claim 6 in which said meat saw component includes a lower pulley cleaning plate adjustably extending downwardly from one of said pair of plates; the distal end of said pulley cleaning plate engaging the blade engaging surface of said lower pulley.

9. The assembly according to claim 1 in which said meat saw component includes a frame, said upper and lower drive pulleys being supported for rotation in said frame vertically above one another, and at least one blade alignment and cleaning means mounted on said frame, said blade alignment and cleaning means including a pair of wheels journalled for rotation in a vertical plane, in said frame, and one upon each side of said blade and a pair of plates adjustably extending inwardly and upwardly from said frame to engage one upon each side of said blade substantially the full width thereof and in leading relationship thereto.

10. The assembly according to claim 9 in which said meat saw component includes lower pulley cleaning plate adjustbly extending downwardly from one of said pair of plates; the distal end of said pulley cleaning plate engaging the blade engaging surface of said lower pulley.

11. The assembly according to claim 1 in which said meat saw component includes a frame, said upper and lower drive pulleys being supported for rotation in said frame vertically above one another, and at least one blade alignment and cleaning means mounted on said frame, said blade alignment and cleaning means including a pair of wheels journalled for rotation in a vertical plane, in said frame, and one upon each side of said blade and a pair of plates adjustably extending inwardly and upwardly from said frame to engage one upon each side of said blade substantially the full width thereof and in leading relationship thereto.

12. The assembly according to claim 11 in which said meat saw component includes a lower pulley cleaning plate adjustably extending downwardly from one of said pair of plates; the distal end of said pulley cleaning plate engaging the blade engaging surface of said lower pulley.

* * * * *